Sept. 15, 1964     F. C. MOORE ETAL     3,148,649
METHOD OF TREATING EGGS
Filed June 28, 1963     2 Sheets-Sheet 1

INVENTORS
FRANCIS C. MOORE
BY and MARVIN W. NICELY

*Lockwood, Woodard, Smith & Weikart*
Attorneys

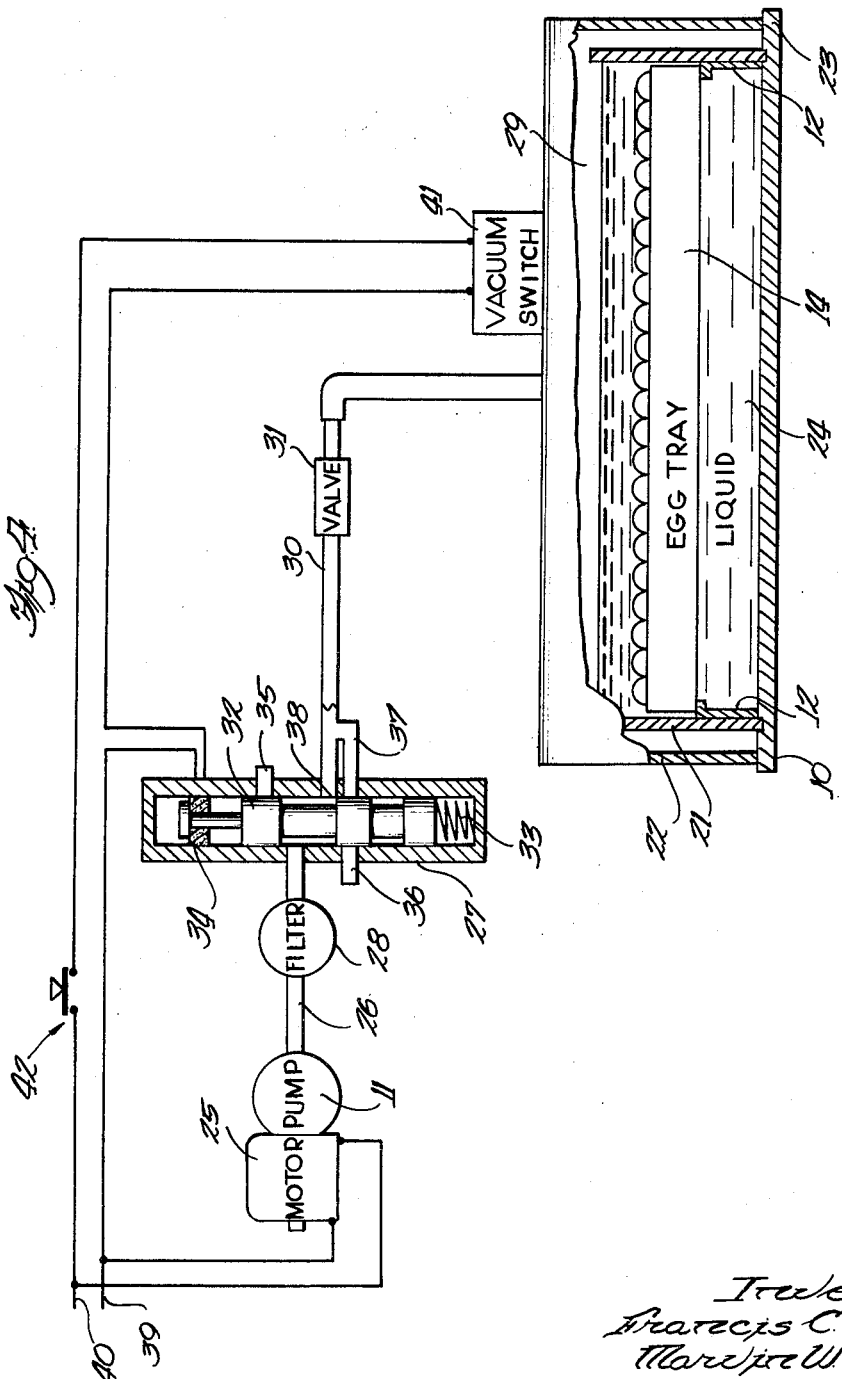

United States Patent Office 3,148,649
Patented Sept. 15, 1964

3,148,649
METHOD OF TREATING EGGS
Francis C. Moore, 3935 Arthington Blvd., and Marvin W. Nicely, 8164 Rosemeade Lane, both of Indianapolis, Ind., assignors of one-third to Wilbur E. Fernandes, Indianapolis, Ind.
Filed June 28, 1963, Ser. No. 292,813
5 Claims. (Cl. 119—1)

This invention relates generally to a method and apparatus for treating avian hatching eggs, and more particularly, it relates to a method and apparatus for introducing treatment materials within the shell of the egg without in any way puncturing or injuring the shell or its contents.

This application is a continuation-in-part of our copending application Serial No. 130,413, filed August 9, 1961, now abandoned.

It has been discovered that avian hatching eggs may be infected with gram positive bacteria, gram negative bacteria and also various types of bacterial spores. It has also been discovered that the hatchability of eggs and the vitality of hatched chicks may be materially improved if various bactericides, disinfectants, antibiotics, hormones, fungicides, vitamins, minerals, and other chemical substances are introduced within the egg prior to or during incubation.

Since an egg shell is itself a hard but porous membrane, the problem in the art is not so much one of getting the treating materials through the shells as it is of precisely controlling the amounts administered and of introducing and maintaining the material within the eggs without injuring the embryo. Efforts have been made in the past to treat eggs by forcing materials through the pores of the shells under increased pressure and thereafter reducing the pressure back to normal atmospheric pressure, but such a procedure has been found to result in the extraction of the same materials forced into the eggs, as well as attending embryo damage and, in many cases, shell breakage. In another procedure, various curative substances have been introduced within eggs by first heating the eggs and then applying a cold solution of the desired treatment material to the shells of those eggs by dipping or spraying. As the eggs cool, the solution is drawn through the shell so that at least some of it becomes effective to destroy bacteria within the eggs or, in the case of vitamins and minerals, to improve the nourishment of the developing embryos. Here again, the treatment method is unsatisfactory because of the extreme difficulty, if not impossibility, of accurately controlling the amount of material introduced into each egg. Insufficient amounts will have no desirable effect upon the embryos and, in many cases, some pronounced undesirable effects, whereas excessive amounts may kill or seriously damage the embryos.

Accordingly, a principal object of this invention is to provide a novel method and apparatus for introducing precisely controlled amounts of medicinal and food materials into avian hatching eggs, thereby overcoming the aforementioned defects and disadvantages of prior practices.

Other objects will appear from the specification and drawings in which:

FIGURE 4 is a schematic and somewhat diagrammatic illustration of an apparatus embodying the present invention and particularly suited for carrying out the method of such invention.

Figure 1:
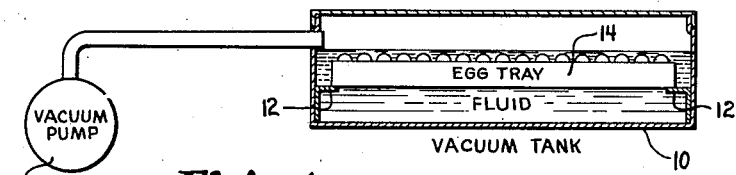
FIGURE 1 is a schematic illustration, partly in cross section, of apparatus for applying liquid materials to avian hatching eggs.
Figure 2:
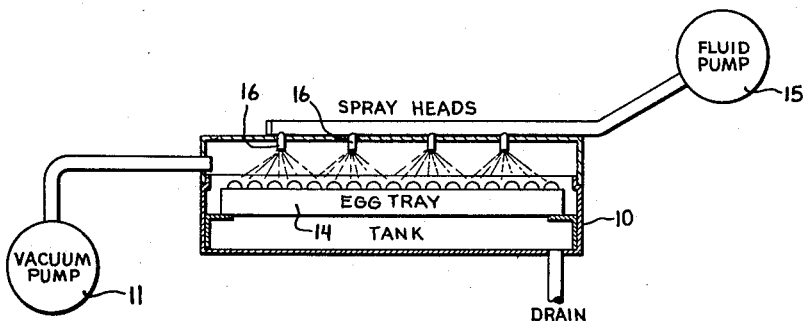
FIGURE 2 is a schematic illustration, partly in cross section, of apparatus for spraying egg treatment materials on a plurality of eggs.
Figure 3:
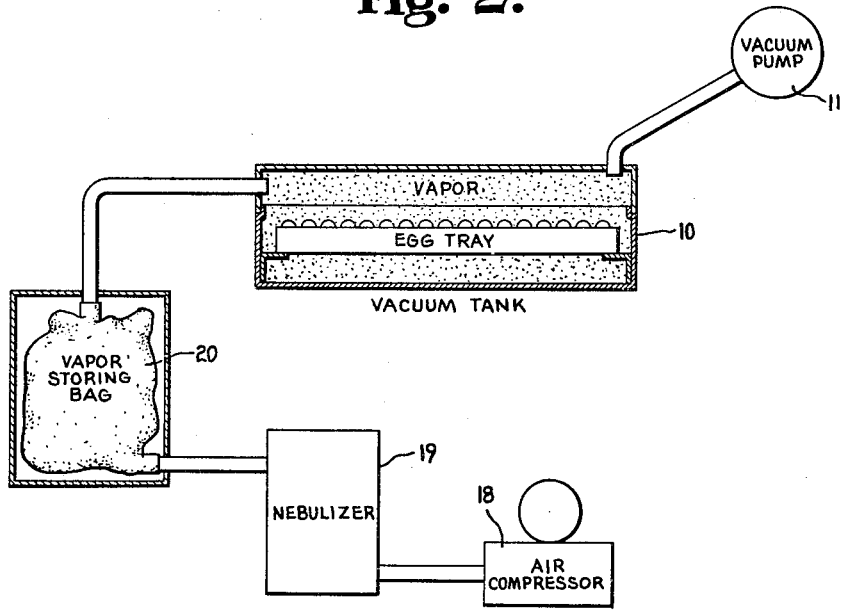
FIGURE 3 is a schematic illustration, partly in cross section, of apparatus for applying nebulized treatment materials to a plurality of eggs.

In accordance with this invention, there is provided a method and apparatus for introducing precisely controlled amounts of treatment materials, such as bactericides, disinfectants, antibiotics, hormones, fungicides, vitamins, minerals, or other chemical materials, into avian hatching eggs, and for maintaining such controlled amounts of materials within the eggs during the hatching process. FIGURES 1–3 illustrate in schematic and generalized fashion three different embodiments of the apparatus for carrying out the method. In each form, the apparatus comprises a vacuum tank 10 to which is connected a vacuum pump 11. Tank 10 may include suitable bracket members 12 for receiving an egg tray 14 which may support any desired number of avian hatching eggs. The tank may be filled with a liquid to a level sufficient to immerse all of the eggs in the tray (FIGURE 1). The pump may then be operated to reduce the pressure within the tank, and such reduction of pressure causes similar reduction of pressure within each egg shell. After such reduction of pressure to a predetermined extent, and for a predetermined interval, the pressure within the tank may be restored to normal atmospheric pressure which will cause the liquid material to penetrate the shell of the egg and to become distributed through the various parts of the egg.

FIGURE 2 of the drawing illustrates a modification wherein there is provided the same type of tank 10, a vacuum pump 11 and a tray 14. In this modification of the invention, there is provided apparatus for spraying the treatment materials over the egg shells. This apparatus may comprise a conventional fluid pump 15 and spray heads 16. As in the case of the apparatus illustrated in FIGURE 1, the tank may be evacuated to reduce the pressure within the eggs, and the treatment materials may be sprayed over the eggs. When atmospheric pressure is restored, the treatment materials penetrate the shells as previously described.

FIGURE 3 illustrates still another modification of this invention including the same type of tank 10 and vacuum pump 11. In this modification of the invention the eggs are treated by evacuating the tank and then supplying treatment materials which have first been nebulized. For nebulizing the treatment materials there is provided an air compressor 18, a nebulizer 19 and a storage bag 20. The bag may be of flexible material so that the space within the bag need not be evacuated. As the vacuum within the tank draws vapor from the bag 20, the bag may collapse under the influence of the vacuum or expand under the influence of the pressure from the nebulizer. It should be understood that any suitable form of nebulizer may be used so long as it reduces particle size of the nebulized material to 10 microns or less.

As previously mentioned, it is essential that the amount of material administered to each egg be precisely controlled, and the conditions of administration be carefully regulated, to avoid damage to the embryo and to insure effective results. FIGURE 4 illustrates in greater detail an apparatus of the type more schematically represented in FIGURE 1. Tank 10 comprises an open-topped inner container 21 and a cover 22, the lower edges of the cover resting upon the outer peripheral flange 23 of container 21 and forming an air-tight seal therewith. As previously described, egg tray 14 is supported within the inner container by brackets 12, the eggs being submerged within a body of liquid 24 within the inner container.

Pump 11 is driven by any suitable means, such as electric motor 25, and communicates through conduit 26 with a solenoid-operated control valve 27. If desired, an air filter 28 may be interposed in line 26. Control valve 27 communicates with the chamber 29 of tank 10 through a conduit 30. An adjustable regulating valve 31 is interposed along line 30 and may be selectively adjusted to vary the size of the orifice therein, thereby varying the length of time required to exhaust the air from chamber 29.

Control valve 27 is a two position valve having a plunger 32 normally held in retracted position by spring 33 but being movable into extended position when the coil 34 of the solenoid is energized. When the plunger is in the extended position illustrated in FIGURE 4, the passages of conduits 26 and 30 are in direct communication with each other through the chamber of the control valve casing. An intake passage 35 in the wall of the casing is blocked off by an enlarged portion of the extended plunger, as is a discharge passage 36 and the passage of a bypass conduit 37. When the plunger is returned by spring 33 to its retracted position, the enlarged intermediate portion of the plunger blocks off the opening 38 for the passage of conduit 30, and conduit 26 is placed in communication with inlet 35. Thus, evacuation of the air from tank chamber 29 is immediately discontinued even though pump 11 and motor 25 continue to operate. At the same time, air returns to the evacuated chamber through conduit 30, bypass conduit 37, and inlet 36 in communication with the bypass conduit through the casing of the control valve.

Current is supplied to the motor through 25 from lines 39 and 40, and a vacuum switch 41 is included in the circuit, as somewhat diagrammatically represented in FIGURE 4, for energizing the solenoid control valve 27 when a predetermined partial vacuum is created within tank chamber 29. The vacuum switch 41 may be adjustable and is, like valve 31, pump 11, motor 25, and filter 28, entirely conventional in construction and operation. Since the structure and operation of vacuum responsive switches are well known, further description is believed unnecessary herein. The circuit may also include a standard push button switch 42 for completing the circuit (or sub-circuit) involving vacuum switch 41 and solenoid valve 27.

In the operation of the apparatus, the settings of vacuum switch 41 and adjustable valve 31 are critical. It has been found that negative pressures of approximately 15 inches or more of mercury tend to damage if not kill the embryos, whereas negative pressures less than approximately 8 inches of mercury are insufficient to cause materiala to pass inwardly through the shells. The preferred range of negative pressures is approximately 9 to 11 inches, with the optimum negative pressure being approximately 10 inches of mercury. Thus, the adjustable vacuum switch 41 must be set to close, and thereby energize the solenoid control valve 47, when the extent of vacuum is greater than 8 but less than 15 inches of mercury.

It has also been found that a sudden reduction in pressure may damage the eggs through shell breakage and through injury to the embryos and, therefore, it is essential that valve 31 be set to permit only a gradual reduction of pressure within chamber 29. Generally, a reduction in less than 10 seconds to the negative pressures falling within the above ranges has been found to cause egg damage. Periods in excess of 25 seconds are desirable and, as brought out in the data of the example included herewith, intervals of 38 seconds or more are particularly effective.

It is to be understood that negative pressures within the specified ranges, and pressure reduction periods in excess of the aforementioned limits, may be varied considerably depending upon the particular egg treating material used and the concentration of that material. It is in all cases necessary that a sufficient amount of treatment material be introduced into the egg to produce the desired effect. For example, in the case of bactericides, the amount of material introduced into the eggs must be sufficiently great to cause an appreciable increase in the percentage of hatch, but must not be so great that it kills or injures the embryos. On the other hand, if insufficient amounts of material are introduced, the results may be worse than no treatment at all since the eggs may be contaminated by the introduction of bacteria or other undesirable organisms and materials in the same operation.

In the operation of the apparatus, the pressure is gradually reduced (or the neagtive pressure is gradually increased) within chamber 29 until, after a predetermined period of time, a selected negative pressure is reached. Vacuum switch 41 then closes and control valve 27 is energized to close opening 38 and open bypass conduit 37, thereby restoring atmospheric pressure within chamber 29. By reason of the increased pressure, some of the liquid 24 is forced into each egg to replace some of the air previously withdrawn therefrom during the evacuation cycle. It will be observed, thererefore, that the treatment material dissolved in the liquid bath 24 is not introduced into the eggs, at least to any appreciable extent, until after the evacuation cycle is completed and atmospreric pressure is restored within chamber 29. It follows that the time limitations disclosed above are primarily important in protecting the eggs and embryos against physical damage which might otherwise arise during the pressure reduction cycle rather than chemical damage or other damage arising after pressure is restored. While a minimum period of approximately 10 seconds has been indicated, periods of considerably greater length (25 seconds or more) are preferred because, among other things, the eggs of any given group are not of uniform porosity. The longer the time period for reaching any given negative pressure, the greater the likelihood of uniform negative pressures being achieved in all of the eggs of a given batch. Where all of the eggs of a batch have reached the same internal negative pressure at the end of a pressure reduction cycle, the restoration of atmospheric pressure in the chamber of the tank will result in the introduction of equal amounts of liquid into all of the eggs. Assuming that the treatment material is uniformly dissolved in the liquid bath, the restoration of atmospheric pressure will thereby result in the administration of equal amounts of treatment material to each of the eggs.

The amount of treatment material to be administered to the eggs of a batch may therefore be precisely controlled by simply selecting an appropriate negative pressure (within the specified range) and an appropriate concentration of material in the liquid bath. While the amount of material to be introduced into each egg may be varied in accordance with the type of material used (i.e., bactericide, antibiotic, nutrient, etc.), it is important to note that for any given material the amount administered may be fully and precisely controlled by reason of the method of the present invention and the apparatus for carrying out the method. Furthermore, the material, once administered or introduced into the eggs, remains therein during the subsequent hatching step because the external pressure (i.e., atmospheric pressure) is not again reduced after the eggs have been withdrawn from the bath and are placed in incubation.

For a more complete understanding of the present invention, reference may be had to the following illustrative example:

*Example*

To determine the optimum amounts of bactericide and fungicide (Poly-Tech No. 5, a quaternary ammonium compound), and the optimum conditions for treating cicken eggs for hatching, the following tests were carried out:

Five batches of treatment solution ranging in concentration from one half ounce to three ounces of Poly-Tech No. 5 per gallon of water were prepared, and tests using the equipment of FIGURE 4 were carried out at different negative pressure and time intervals. All eggs were from the same flock of hens. The controlled and treated eggs for each experiment were gathered from the hens the same day and at the same time. The conditions of incubation were the same for both the treated and control (untreated) lots of eggs.

Te following chart shows the different results from experiments performed:

| No. of Eggs, Controls | No. of Eggs Treated | Amount of Bactericide per Gal. Water, oz. | Inches of Vacuum | Seconds Vacuum was appl. to Eggs | Percent of Hatch on Control Eggs | Percent of Hatch on Treated Eggs | Percent Dif. in Hatch |
|---|---|---|---|---|---|---|---|
| Group #1: | | | | | | | |
| 1,480 | 1,480 | ½ | 8 | 25 | 73 | 71.9 | −1.1* |
| 1,480 | 1,480 | ½ | 8 | 25 | 72.9 | 72.1 | −0.8* |
| Group #2: | | | | | | | |
| 1,480 | 1,480 | ½ | 10 | 40 | 73.0 | 69.4 | −3.6* |
| 1,480 | 1,480 | ½ | 10 | 40 | 73.0 | 70.8 | −2.2* |
| Group #3: | | | | | | | |
| 1,480 | 1,480 | 1½ | 10 | 40 | 74.9 | 75.1 | +0.02 |
| 1,480 | 1,480 | 1½ | 10 | 25 | 76.8 | 75.3 | −1.5* |
| Group #4: | | | | | | | |
| 1,260 | 1,260 | 2 | 10 | 40 | 69.6 | 74.7 | +5.1 |
| 1,260 | 1,260 | 2 | 10 | 40 | 71.4 | 77.5 | +6.1 |
| Group #5: | | | | | | | |
| 1,600 | 1,600 | 2¾ | 10 | 40 | 72.4 | 78.9 | +6.5 |
| 1,600 | 1,600 | 2¾ | 15 | 48 | 71.4 | 61.3 | −10.3 |
| Group #6: 3,260 | 3,260 | 2½ | 10 | 38 | 69.8 | 75.9 | +6.1 |
| Group #7: 690 | 690 | Distilled water | 15 | 40 | 73.6 | 64.4 | −9.2* |
| Group #8: 1,680 | 1,680 | 2¾ | 14 | 40 | 76.8 | 77.1 | +0.3 |
| Group #9: 1,680 | 1,680 | 1 | 8 | 40 | 78 | 76.2 | −1.8 |
| Group #10: 1,680 | 1,680 | ½ | 15 | 25 | 77 | 71.4 | −5.6 |
| Group #11: 1,490 | 1,490 | ½ | 9 | 3 min. | 74.4 | 78.6 | +4.2 |

An asterisk (*) indicates that at least some of the eggs of the batch exploded during incubation. Such explosions are caused by increased internal pressure produced by bacterial action and are evidence that the dosage of bactericide administered to the eggs was inadequate. It will be noted that wherever an asterisk appears, there was a lower percentage of hatch in the treated batch than in the untreated (control) batch.

The results with respect to Group 1 show that insufficient amounts of bactericide were used. While 8 inches of vacuum did pull small amounts of solution into the eggs, the overall effect was a reduction in hatchability.

The results with respect to Group 2 clearly show that the concentration of bactericide was insufficient. A greater amount of solution was introduced into the eggs than in the Group 1 experiment, and this resulted in greater contamination and a more substantial reduction in hatchability.

With respect to Group 3, the results reveal a significant reduction in bacteria at 10 inches of vacuum and 40 seconds. It will be noted that exploders were eliminated.

The test results of Groups 4, 5 (first test) and 6 reveal a good balance between bactericide, vacuum and timing. In the second experiment of Group 5, the hatch was reduced more than 10 percent because of a toxic reaction in the eggs. Excessive amounts of bactericide not only killed the bacteria but also a substantial number of embryos.

The results of Groups 7 and 10 reveal that negative pressures as high as 15 inches cause internal damage to eggs, resuluting in a substantial reduction in hatch and many exploders, whereas the results of Group 11 indicate that if negative pressure is within the critical range, the period of time for application of the vacuum may be extended considerably.

While in the foregoing we have disclosed embodiments of the invention in considerable detail for purposes of illustration, it will be understood by those skilled in the art that many of these details may be varied without departing from the spirit and scope of the invention.

We claim:

1. In a method of introducing controlled amounts of treatment materials into avian hatching eggs, the steps of placing a hatching egg in a chamber at atmospheric pressure, gradually reducing the pressure within said chamber to a maximum negative pressure within a range greater than 8 but less than 15 inches of mercury to withdraw air from said egg, exposing the outer surface of said egg to a fluid treatment material capable of flowing through the pores of the shell thereof, restoring atmospheric pressure within said chamber to force a predetermined quantity of said fluid treatment material through said pores into said egg to replace the air withdrawn therefrom, and thereafter maintaining said egg at a pressure no lower than atmospheric pressure to retain said material therein during subsequent incubation.

2. In a method of introducing controlled amounts of fluid treatment materials into avian hatching eggs, the steps of placing a hatching egg in a chamber at atmospheric pressure, gradually reducing the pressure within said chamber over a period of not less than approximately 10 seconds to a maximum negative pressure within a range greater than 8 but less than 15 inches of mercury to withdraw air from said egg, exposing the outer surface of said egg to a fluid treatment material capable of flowing through the pores of the shell thereof, restoring atmospheric pressure within said chamber to force a predetermined quantity of said material through said pores into said egg to replace the air withdrawn therefrom, and thereafter maintaining said egg at a pressure no lower than atmospheric pressure to retain said material therein during subsequent incubation.

3. In a method of introducing a predetermined quantity of fluid treatment material into an avian hatching egg, the steps of placing a hatching egg in a liquid bath contained in a chamber at atmospheric pressure, said bath containing a selected concentration of egg treating material, gradually reducing the pressure within said chamber over a period of not less than approximately 10 seconds to a maximum negative pressure within a range greater than 8 but less than 15 inches of mercury to withdraw air from said egg, restoring atmospheric pressure within said chamber to force a predetermined quantity of said egg treating material through the pores of the egg shell to replace the air withdrawn from said egg, and thereafter maintaining said egg at a pressure no lower than atmospheric pressure to retain said material therein during subsequent incubation.

4. The method of claim 3 in which said step of restoring atmospheric pressure occurs immediately following the attainment of said maximum negative pressure within said chamber.

5. The method of claim 3 in which said maximum negative pressure falls within the range of 9 to 11 inches of mercury.

References Cited in the file of this patent

UNITED STATES PATENTS

| | | |
|---|---|---|
| 1,228,451 | Latta | June 5, 1917 |
| 2,751,882 | Coyner | June 26, 1956 |
| 2,802,772 | Elder | Aug. 13, 1957 |
| 2,851,006 | Taylor | Sept. 9, 1958 |
| 2,984,240 | Eames | May 16, 1961 |

FOREIGN PATENTS

| | | |
|---|---|---|
| 166,927 | Great Britain | July 20, 1921 |
| 335,586 | Great Britain | Sept. 29, 1930 |
| 673,765 | Great Britain | June 11, 1952 |